April 27, 1954  H. A. QUIST  2,676,606
PRESSURE OPERATED OSCILLATING VENT VALVE
Filed May 9, 1952  2 Sheets-Sheet 1

INVENTOR.
HAROLD A. QUIST
BY
Busser, Smith and Harding
ATTORNEYS

April 27, 1954  H. A. QUIST  2,676,606
PRESSURE OPERATED OSCILLATING VENT VALVE
Filed May 9, 1952  2 Sheets-Sheet 2

INVENTOR.
HAROLD A. QUIST
BY
Busser, Smith and Harding
ATTORNEYS

Patented Apr. 27, 1954

2,676,606

UNITED STATES PATENT OFFICE 2,676,606

PRESSURE OPERATED OSCILLATING VENT VALVE

Harold A. Quist, Swarthmore, Pa., assignor to Sun Oil Company, Philadelphia, Pa., a corporation of New Jersey Application May 9, 1952, Serial No. 286,862

6 Claims. (Cl. 137—250)

This invention relates to pressure operated devices in general and more particularly to pressure responsive valves adapted to relieve excess pressure and vacuum conditions arising in vessels used for the storage of volatile liquids.

A pressure responsive gas control valve arranged to engage a liquid seal over the open end of a venting conduit briefly describes the known cooperating elements of relief mechanisms for direct pressure response. To operate for both pressure and vacuum conditions, this form of direct pressure operated valve is required to oscillate to separate relieving positions, one clockwise and the other counterclockwise. As a result the structure is complicated and the operation retarded. In addition, large quantities of sealing liquid are entrained in the flow of relieving gases, outwardly or inwardly, requiring constant maintenance.

As a result of these defects, improvements were made including one direction opening, as well as modified valve forms, which conserve the liquid seal and improve operating characteristics. The reversal of the tank pressures to attain one direction opening, in response to either excess pressure or excess vacuum conditions relative to normal atmospheric pressure as a measure, is controlled by a pressure responsive actuating device. By means of such an actuator, either the excess positive or negative tank pressure is transmitted in cooperation with atmospheric pressure to cause the proper relieving response in the valve member. This combination of elements normally requires several separate liquid supporting housings and attending conduits to convey the operating pressures between them. It is an object of this invention to provide a pressure-vacuum venting device in which single direction operation is retained and all the operating elements are enclosed in one housing requiring only one liquid seal.

In addition to utilizing one seal, long runs of conduit and the number of intervening moving parts are reduced to an operating minimum. Relief valves of complex design absorb much of the available tank pressure in overcoming friction and operating these elements before the main valve member is moved. Consequently more of the tank pressure force is used for operation and the response is greatly accelerated by reducing the number of movable members and collapsing the device. It is, therefore, a further object of this invention to utilize the full force of the storage tank pressures for direct relief purposes by minimizing the pressure consuming elements.

Improvements in the operating characteristics of relief valves responsive to both pressure and vacuum conditions have been sought to remove objectionable "chattering" and "hunting." A valve properly balanced to respond to one condition may operate sluggishly or not at all in closing or under conditions of reverse pressures. It is still another object of this invention to provide a relieving device responsive to controlled conditions of both pressure and vacuum and positive in the closing operation after the relief movement for either condition.

The present invention includes a valve member pivotally suspended in a housing for oscillating movement into sealing engagement with a cooperating body of liquid. A relief conduit projecting into the valve body is normally sealed by this valve and liquid contact arrangement. In connected operating relation to the valve member, a pressure responsive mechanism is suspended to oscillate this member in response to admitted pressures. Positioned in the same housing and in contact with the liquid seal of the valve member and pressure responsive mechanism, a pressure responsive actuator is pivotally mounted. Conduits extend through the housing and the sealing liquid to carry tank and atmospheric pressures to the movable elements of both the actuator and the pressure responsive mechanism.

For a more complete understanding of the nature and scope of the invention in which the above noted objects and others will be evident, reference is made to the following detailed description read in connection with the accompanying drawing in which.

Figure 1:
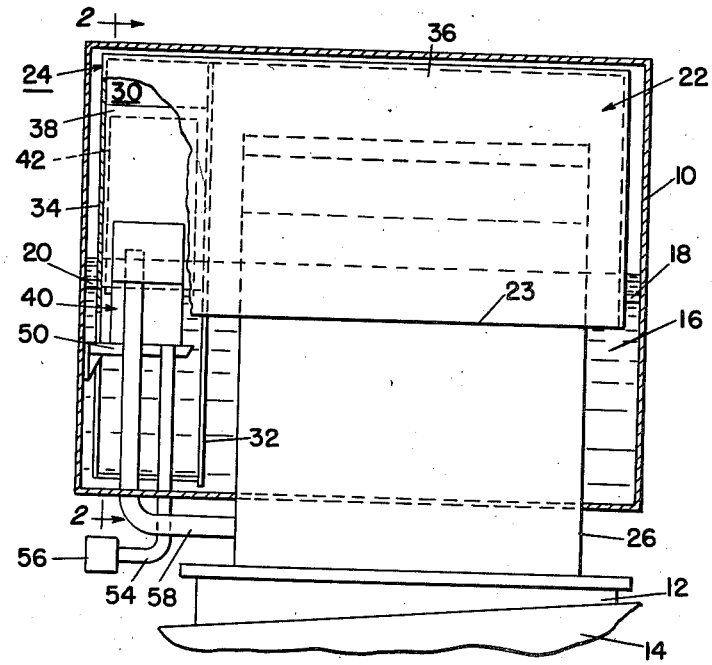
Figure 1 is an elevational view of the device in section along line 1—1 of Figure 2.

Referring to Figure 1, the housing 10 in which the operating elements of the relief mechanism are suspended is shown in section and mounted on the cover of a manhole 12 on storage tank 14. A sealing liquid 16 is maintained at operating level, normally of sufficient depth to submerge the frictionally engaged surfaces to improve the operating characteristics. The pivotal supports 18—20 of the valve member 22 and the adjacent pressure responsive section 24 are so submerged. A relief gas flue 26 is the support for the housing 10 in the illustrated device and extends through the liquid seal and the housing to open inside the valve member 22 above the liquid level. The hooded opening 28 is shown aligned with the flow channel of the relief gases entering or leaving flue 26 and may extend across the entire width of the housing 10 or be limited to any portion thereof as required.

Figure 2:
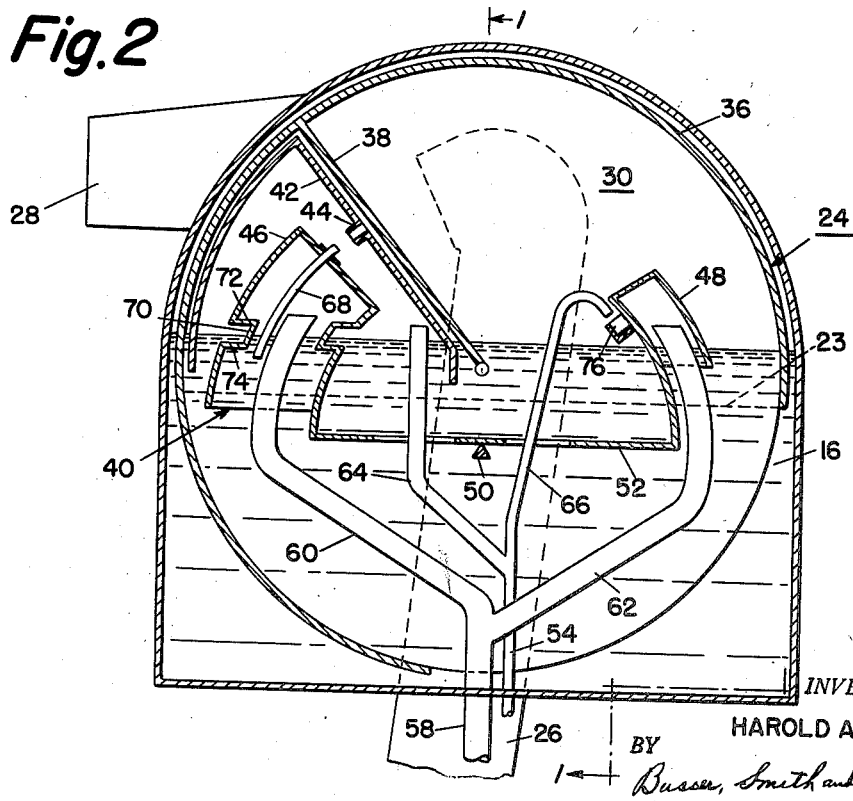
Figure 2 is an elevational view in section of Figure 1 along line 2—2.

The pressure responsive member 24 is shown in Figure 1 forming a chamber 30 extending from one end of the valve member 22. A partition 32 separates the valve 22 and the pressure responsive chamber 30. As is evident from Figures 1 and 2, the valve 22 is indicated as a hollow, semi-cylindrical member normally in sealing engagement with the liquid 16 over the open end of the flue 26. The chamber 30 of the pressure responsive means 24 is shown as formed between the common partition 32 and the end plate 34. Both of these plates 32 and 34 are shaped as full circles. The peripheral plate 36 is cut to form the semi-cylindrical valve member 22 and extend around the circumference of the plates 32 and 34 to complete substantially three quarters of a cylinder forming chamber 30. This is shown in Figure 2. The remaining segment of substantially 90 degrees arc is uncovered, positioned to be always submerged in the sealing liquid and admits the necessary pressure conductors.

Within the chamber 30, a baffle 38 is fastened to the circumferential plate 36 and the plates 32 and 34 to divide the chamber space into two separate volumes. These volumes are maintained separate by extending the baffle 38 downwardly into the sealing liquid 16. The chamber 30 thus sealed and divided into two pressure receptive volumes forms the pressure responsive mechanism and is shown in physical continuation of the valve member 22.

An actuating means inclusively designated as number 40 is arranged to select and transmit operating pressures to the pressure responsive mechanism. It is positioned within the chamber 30 in effective engagement with the baffle 38. The actuator 40 includes a baffle 42, which in contrast with baffle 38 is relatively fixed. This baffle 42 is arranged to enclosed a separate gas controlling cell or passage within one of the compartment divisions of the chamber 30 as formed by the radially positioned baffle 38. The necessary supporting brackets for this baffle are omitted from the drawing to prevent confusion but are readily visualized as fastened to the pressure conduits or other supports by those versed in the art. An aperture 44 is arranged in the fixed baffle 42 for transmission of pressures therethrough, better understood after reading the operation of the device later in this specification.

In addition to the fixed baffle 42, the actuator 40 includes pressure responsive inverted cups 46 and 48 of different size which are pivoted at 50 to oppose each other on a supporting beam 52. This beam is shown as slotted or apertured to admit branches 64 and 66 of the atmosphere conducting conduit 54. On the exposed end of conduit 54 in contact with the atmosphere a drying unit 56 adapted to contain a replaceable volume of desiccant is connected. Tank pressure transmitting conduit 58 is shown bent toward and opening into relief flue 26 which is always open to tank pressures.

The sectional view of the actuator in Figure 2 shows the inverted cups 46 and 48 in normal position sealing the branches 60 and 62 of conduit 58. The branches 64 and 66 of conduit 54 conduct air at atmospheric pressure to both sides of the movable baffle 38. All the conduit branches extend to open above the surface of the sealing liquid, within the chamber 30 of the responsive means 24, and in position to cooperate with the actuating means 40.

Figure 3:
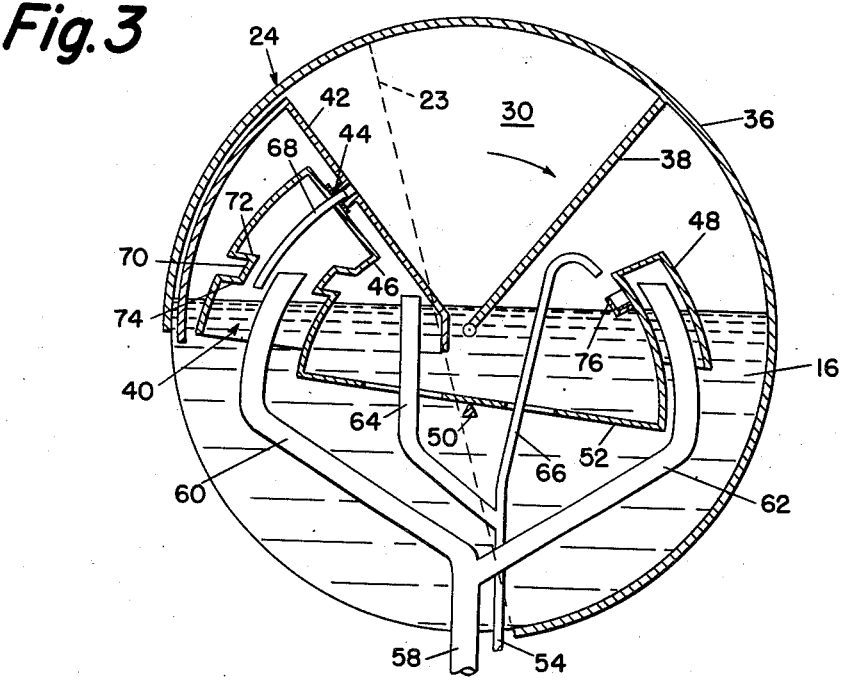
Figures 3 and 4 are elevational views in section of the movable elements in Figure 2 showing operating positions.

As disclosed, the actuator 40 includes the several elements required to deliver the selected operating pressures to the responsive mechanism 24. Of primary importance, the inverted cups of different size 46 and 48 require further description in order to be fully understood in the later discussion of operation. Inverted cup 46, fixed to the supporting beam 52, is positioned to remain in sealing engagement with the liquid at all times. A vent pipe 68 is fastened in the top of the cup which is slanted to avoid engaging the baffle 42 as it moves. As shown the pipe is permitted to project sufficiently to move into the aperture 44 when the cup 46 lifts in response to excessive tank pressures. When so lifted the lower end of the vent 68 clears the sealing liquid as shown in Figure 3. About the liquid contacting walls of the cup 46 and at the liquid level in this the normal position a groove 70 is formed. This groove is fashioned to present surfaces parallel to the liquid surface of appreciable area and forms a means for acceleration of the actuator movement. For purposes of clearly following the description of the operation the upper surface of the groove 70 within the cup 46 is designated as 72 and the lower surface as 74.

Figure 4:
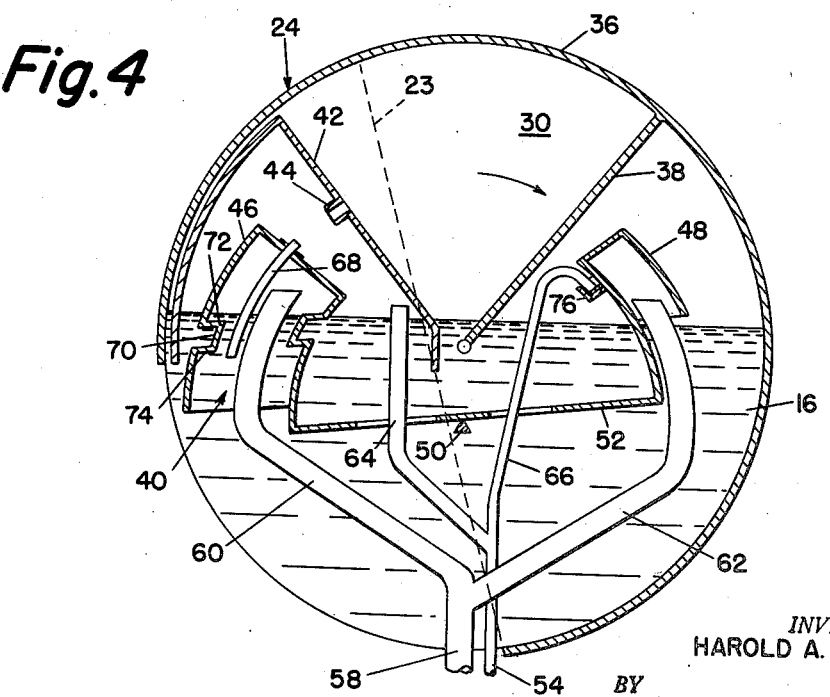

The smaller cup 48 of the two inverted cups comprising this part of the actuating means is fastened to the beam 52 in opposition to cup 46. Cup 48 is not as deep as cup 46 as it is designed to clear the liquid in relieving excessive vacuum conditions as indicated in Figure 4. A sealing cap 76 is attached to cup 48 to engage the open end of atmosphere admitting conduit branch 66 which is further bent to be engaged and sealed thereby.

It discussing the operation of the device reference will be made to Figure 3 for excess pressure relief and to Figure 4 for excess vacuum relief. Only the movable members are shown, the housing being omitted. In both these figures the bottom edge 23 of the semi-cylindrical valve member 22 is shown in dotted line to illustrate the position it assumes when relieving either condition. The relief flue 26 is omitted also from these figures to clarify the more important operating detail.

At the beginning of any relieving operation, the elements are considered as in the normal position conserving the volatile constituents of the stored liquid. This is shown in Figures 1 and 2 referred to and described above. In Figure 2, the structure on which Figures 3 and 4 are based, the normal or non-relieving position is shown. The movable baffle 38 of the pressure responsive mechanism 24 is at rest adjacent the fixed baffle 42. As the valve member 22 forms an extension of the chamber 30, it too is in sealing position over the open end of flue 26 as shown by the dotted line 23 of the lower edge. The inverted cups 46 and 48 are in balanced position sealing the branched ends 60 and 62 of the conduit 58 as they extend above the surface of the sealing liquid 16.

As the internal pressure in the storage tank increases, caused by rising temperatures, pumping additional quantities of liquid into storage or like conditions, the excess pressure is transmitted by conduit 58 to the cups 46 and 48 through branches 60 and 62. The larger size of cup 46 presenting a greater area subjected to the pressure moves the beam 52 in a clockwise direction about the pivot 50.

Initially the tank pressure operating to lift the cup 46 upward is offset by a proportionate amount of the same pressure operating downwardly on the exposed upper surface 72 of the groove 70 above the liquid. Thus the initial movement is retarded. However, when the lower surface 74 of the groove 70 clears the liquid as in Figure 3, this retarding effect is counterbalanced and the movement of cup 46 into engagement with the fixed baffle 42 is sharply accelerated. At the time of engaging the baffle 42 the protruding end of vent pipe 68 passes into the aperture 44 and the end within the cup clears the surface of the sealing liquid. The atmospheric pressure admitted through branch conduit 64 is confined below the fixed baffle 42 when the vent pipe engages the aperture 44. Thus a connecting conduit path is established between the storage tank interior to the adjoining surface of the movable baffle 38 for transmission of excessive tank pressures.

On the opposite end of the beam 52, the cup 48 is moved downwardly increasing the strength of the seal over the branch conduit 62. The atmosphere conducting branch 66 remains open admitting air at atmospheric pressure to fill the volume in chamber 30 on the side of the baffle 38 opposed to excessive tank pressures. Therefore the only pressure opposing the pressure responsive mechanism's clockwise movement is atmospheric which may be discharged through branch 66 and conduit 54 as the movable baffle 38 moves in rotation. The excessive tank pressure existing on the driving side of the baffle is not admitted to the driven side as branch conduit 62 is firmly sealed by cup 48.

The direct result of the actuating means operating as above described is to cause the pressure responsive means 24 to rotate in a clockwise direction as shown by the arrow in Figure 3. This, in turn, rotates the valve member 22 to clear the sealing liquid and expose the open end of relief flue 26. The excess tank pressure is vented through the opening 28 in the housing 10 until reduced to non-operating force.

When the excess pressure is expended the cup 46 of the actuator returns to the normal position disengaging the vent pipe 68 from the baffle aperture 44. The effect of this disengagement is to immediately balance the pressures on both sides of movable baffle 38 by admitting atmospheric pressure thereto. Atmospheric pressure admitted by branch conduit 64 under fixed baffle 42 is now admitted to the driven side of movable baffle 38 through aperture 44. The valve member returns to and remains in sealing position over flue 26 without further movement.

When excessive sub-atmospheric pressures, defined here as vacuum, are created by falling temperatures, pumping out or like conditions, the elements of the device are substantially at the starting position shown in Figure 2. As the vacuum becomes excessive the greater effective area of inverted cup 46 in the actuator means 40 causes the beam 52 to tip as shown in Figure 4. The initial slow movement of cup 46 is accelerated when the opposing upper surface 72 of the groove 70 is submerged. The beam is then tilted sharply to lift cup 48 from the liquid. The vacuum is admitted to the driven side of baffle 38 and the atmosphere is sealed in branch conduit 66 by closing of cap 76 over the open end.

The driving force in this condition is furnished by atmosphere transmitted through branch conduit 64 and through the open aperture 44 in the fixed baffle 42. As cup 46 is held deep in the sealing liquid, the vacuum condition is firmly sealed in branch conduit 60 and the transmission of atmospheric pressure to operate the movable baffle 38 through aperture 44 is assured. The result is to drive the baffle in a clockwise direction as indicated by the arrow in Figure 4, opening the valve member 22. As the liquid seal over the exposed end of flue 26 is broken by the rotation of valve member 22 the atmosphere is admitted to the storage tank to relieve the excess vacuum condition.

As indicated above for the positive return of the valve to the sealed position after excess pressure relief without "hunting" or "chattering," the effect is the same after vacuum relief. The release of the vacuum condition permits the actuating means to return to the balanced position of Figure 2. Atmosphere is admitted to the driven side of baffle 38 as the sealing cap 76 uncovers the open end of branch 66. This balances both sides of the baffle 38 at atmospheric pressure. The prompt establishment of a balanced atmospheric pressure condition on both sides of the baffle 38 permits the valve member to return to the normal position. As the actuator 40 has severed connection between the responsive mechanism and the internal tank pressures by returning to the normal position, the effect of balancing the pressures at atmospheric is to return the valve member 22 to sealing position over the flue 26 and maintain it motionless.

By thus collapsing the several elements of the activated relief valve mechanism into one liquid seal supporting housing a prompt acting valve of a limited number of elements is achieved. The maximum pressure is made available for operation, reducing the operating losses to a minimum. By establishing a constant atmospheric pressure throughout the pressure responsive mechanism during non-operation, the valve is operated sharply and effectively and otherwise maintained stationary.

I claim:

1. A pressure relief system for storage tanks comprising a housing adapted to maintain a liquid therein, a hollow valve member open at the bottom, normally sealed thereat in the liquid and pivotally mounted to oscillate to an unsealed position and connect the interior thereof with the housing above the liquid, a relief gas flue adapted for constant communication with the tank and extending into the space within the hollow valve member above said liquid level, said housing having an atmospheric opening for the transmission of relief gases therethrough when released by the oscillation of said valve member, a pressure responsive chamber, being open at the bottom and in constant sealing relation with the liquid, operably connected to said valve member in the housing and divided into two adjacent sealed compartments above the liquid level by a baffle extending from the periphery thereof into sealing contact with the liquid, a gas control passage projecting above and in sealing relation with the liquid into one of the compartments of the pressure responsive chamber and apertured to transmit operating pressures against said baffle, a tank pressure conveying conduit extending into each of the compartments above the level of the sealing liquid, an oscillating actuator pivotally suspended in sealing contact with the liquid therein to control the passage of gas from said tank pressure conduits, said actuator being oppositely reciprocable in response to excessive pressure and vacuum conditions in said tank to select and direct said excess pressure to a determined compartment in the pressure chamber causing unidirectional rotation of said valve member for relief of both pressure and vacuum excesses, and atmospheric conducting tubes extending into the gas control passage and the remaining compartment above the sealing liquid level, the tube extending into said control passage being open to atmosphere at all times, the tube extending into the remaining compartment being engageable by said actuator to exclude atmosphere when the tank excess vacuum condition requires relief.

2. The combination defined in claim 1 further characterized by the pivotally suspended oscillating actuator including spaced apart inverted cups positioned to normally contact the liquid in sealing engagement and intercept the transfer of tank pressures directed into the gas control passage and the remaining compartment, a tubular connection in the cup cooperating with said gas control passage adapted to project into the aperture in said passage and transmit excess tank pressures against the baffle separating the compartments in said pressure chamber, said oscillating movement of the actuator in pressure response being directioned to continue the admission of atmospheric pressure into the remaining compartment to provide a pressure differential, a sealing cap projecting from the cup to engage the tank pressure conduit in the remaining compartment positioned to close the atmospheric conducting tube therein in response to the oscillation caused by the tank excess vacuum condition, whereby the constant atmospheric pressure in the gas control passage is admitted through said aperture to oscillate the baffle in the relieving direction for excess tank vacuum relief.

3. A pressure relief system for storage tanks comprising a housing adapted to maintain a liquid therein, a hollow valve member open at the bottom, normally sealed thereat in the liquid and pivotally mounted to oscillate to an unsealed position to connect the interior thereof with the housing above the liquid, a relief gas flue adapted for constant communication with the tank and extending into the space within the hollow valve member above said liquid level, said housing having an atmospheric opening aligned with said flue for the transmission of relief gases therethrough when released by the oscillation of said valve member, a pressure responsive chamber, being open at the bottom and in sealing relation thereat, operably connected to said valve member in the housing, a movable baffle peripherally engaging the chamber and extending into sealing contact with the liquid thereby dividing the valve chamber into two sealed compartments above the liquid level, a stationary enclosure in sealed relation with the liquid and having an orifice communicating with the near side of said baffle, a conduit connecting said enclosure with the atmosphere, an oscillator and an enclosure carried thereby in sealed relation with the liquid and extending into the stationary enclosure, a second conduit connecting the oscillatable enclosure with the tank, said oscillator and the enclosure carried thereby being movable in one direction or the other from its median position by opposing pressures in the two enclosures, means operable when the oscillatable enclosure is moved in one direction by rise in pressure in the tank to close said orifice and afford fluid communication between the oscillatable enclosure and the near side of said baffle, and a third conduit connecting during said movement the sealed compartment beyond the far side of said baffle with the atmosphere.

4. The relief system claimed in claim 3 comprising also a fourth conduit in communication with the tank, and means operable, when the oscillatable enclosure is moved in the other direction by fall in tank pressure, to disconnect the third conduit from the atmosphere and connect the fourth conduit with the sealed compartment beyond the baffle, said orifice in the stationary enclosure transmitting the atmospheric pressure therein to the near side of the baffle.

5. The relief system claimed in claim 3 in which the oscillator is pivoted between its ends and in which said oscillatable enclosure is carried at one end of the oscillator and is an inverted cup whose lower open end extends into the body of liquid, an inverted cup carried at the other end of the oscillator and whose lower open end extends into the body of liquid when the first named cup is in its median position and while moved by rise in pressure in the direction specified, a fourth conduit in communication with the tank and extending into the second named cup, the second named cup, when the oscillator is moved by fall in pressure in the tank in the opposite direction to that specified in claim 3, being lifted to raise its lower end above the liquid level and thus connect the fourth conduit with the sealed compartment beyond the baffle, said orifice in the stationary enclosure transmitting the atmospheric pressure therein to the near side of the baffle, and means carried by the second-named cup in its last named movement to seal the third conduit from the atmosphere.

6. A pressure relief system for storage tanks comprising a housing adapted to maintain liquid therein, a hollow valve member open at the bottom, normally sealed thereat in the liquid and pivotally mounted to oscillate to an unsealed position to connect the interior thereof with the housing above the liquid, a relief gas flue extending through the liquid and said housing into said valve member above the liquid level, a chamber in longitudinal extension of said valve member having an opening in the bottom thereof arranged to be sealed by the liquid in all positions, a baffle in said chamber contacting the liquid and extending to the periphery thereof to divide the chamber into two adjacent compartments above the liquid surface, a fixed baffle enclosing a gas control passage in sealing contact with the liquid in one of said compartments having an aperture for the passage of gas between the compartment and the baffle passage, separate conduits for the transmission of atmospheric and gas pressures extending through the sealing liquid into the fixed baffle passage and the adjacent chamber compartment, pivotally supported inverted cups in contact with the liquid to form sealing engagement over the gas transmitting conduits, the cup in the baffle passage being apertured to engage the aperture in the fixed baffle in operating oscillation for transmission of pressure therethrough, and the cup in the chamber compartment adapted to oscillate into alternate engagement with the respective atmospheric and gas transmitting conduits opening therein.

References Cited in the file of this patent

UNITED STATES PATENTS

| Number | Name | Date |
|---|---|---|
| 1,678,700 | McEwan | July 31, 1928 |
| 1,901,576 | Atwell | Mar. 14, 1933 |
| 1,912,024 | Uebermuth | May 30, 1933 |
| 2,591,098 | Quist | Apr. 1, 1952 |